June 3, 1969  Z. E. GRANAT  3,447,616
DRILLS
Filed Dec. 29, 1966
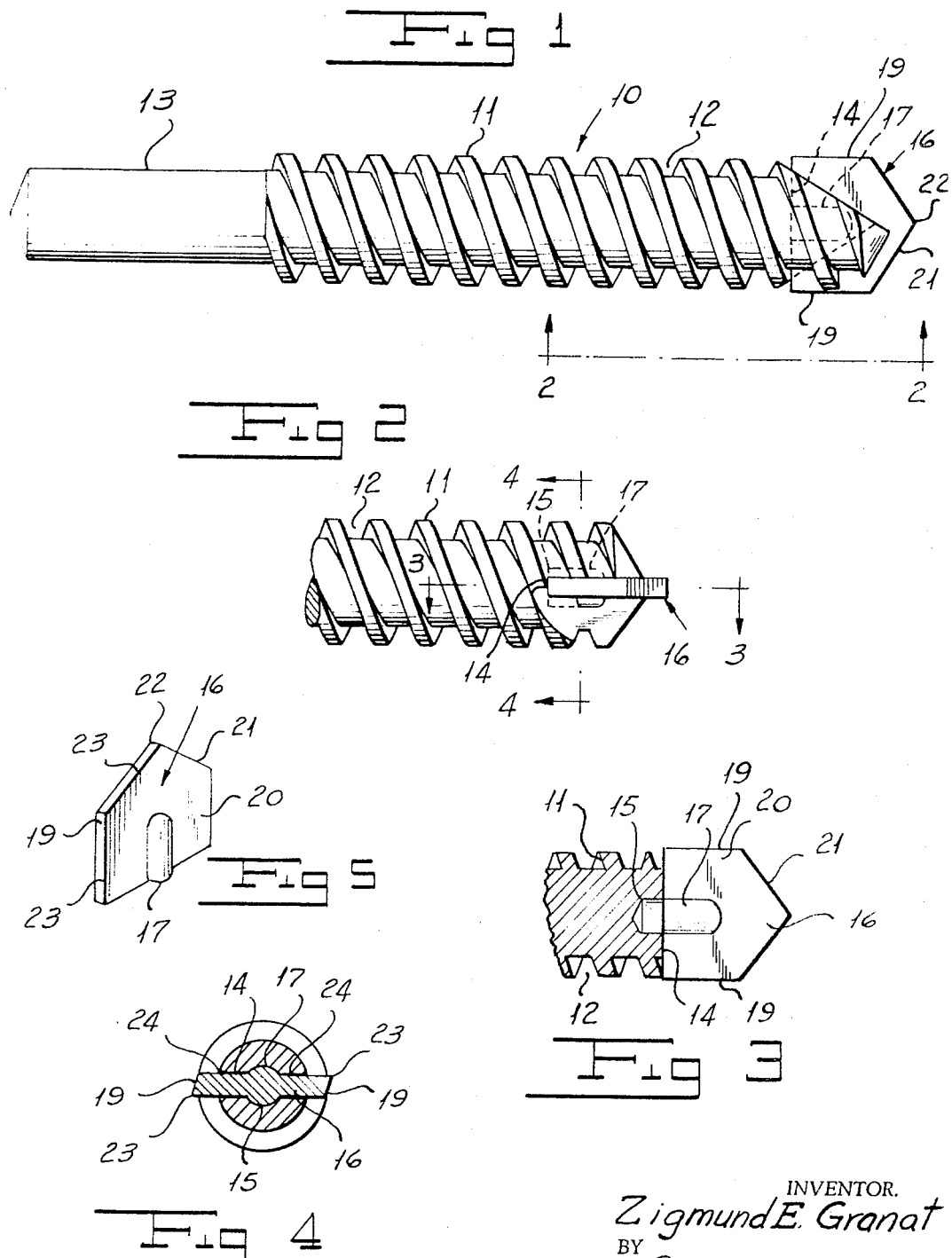
INVENTOR.
Zigmund E. Granat
BY
Robert F. Beck
ATTORNEY

UNITED STATES PATENT OFFICE 3,447,616
Patented June 3, 1969

3,447,616
DRILLS
Zigmund E. Granat, 14 Prince Court, Wayne, N.J. 07470
Filed Dec. 29, 1966, Ser. No. 605,719
Int. Cl. E21c *13/02, 13/01*
U.S. Cl. 175—394       4 Claims

ABSTRACT OF THE DISCLOSURE

A drill having a detachable blade mounted on the end thereof in a slot extending transversely of the body of the drill and which blade is provided with a hub having portions on opposite faces of the blade constructed to fit into an opening in the end of the drill at opposite sides of the slot so as to align the blade accurately with respect to the length of the drill.

---

My invention relates to drills and more particularly to that class employed for drilling relatively hard material, such as concrete, brick, masonry and the like, some examples of the prior art being disclosed in U.S. Patents Nos. 2,565,333, 2,578,593, 2,635,856, 2,673,714, 2,673,-716, 2,673,717 and 3,117,637.

Drills of the above described class are usually each provided with a relatively hard plate-like cutting tip or member constructed of tungsten carbide or the like and which member is secured to the leading end of the drill body by means of solder or the like. Obviously, when attaching a cutting member to the body, it is essential that the cutting edges of the cutting member be disposed equal distances from the axis of the body and beyond the crest of the thread forming the discharge channel on the body in order to preclude sidewise movement or "swaying" of the drill and thus equalize the work-load imposed upon the cutting faces of the member. This so-called swaying occurs during a drilling operation when the cutting member is not properly transversely centered with respect to the axis of the body.

One of the objects of my invention is to provide a drill equipped with means for insuring transverse centering of the cutting member relative to the axis of the body when attached thereto.

Another object of my invention is to provide a drill of the foregoing described character wherein the cutting member may be removed from the drill body and which member is equipped with means whereby the member may be accurately replaced in proper cutting position with respect to the axis of the body.

A further object of my invention is to provide a drill of the foregoing character wherein the cutting member is provided with means for properly positioning the member on the leading end of the drill body without the use of a guide fixture or the like.

A still further object of my invention is to provide a drill of the foregoing character wherein the cutting member, when attached to the body, will not interfere with the travel and discharge of the grindings or cuttings through the spiral channel or flute defined by the thread formed on the body.

An important object of my invention is to provide a drill of the foregoing described character which is simple in construction, durable in use and economical in manufacture.

With the above and other objects in view, as will hereinafter appear, the invention consists in the combination and arrangement of parts hereinafter set forth and illustrated in the accompanying drawings from which the several features of the invention and the advantages attained thereby will be readily understood by those skilled in the art.

Referring to the drawings wherein like reference characters designate like parts throughout the several views:

FIGURE 1 is a side elevation of the invention;

FIGURE 2 is a side elevation of the invention looking in the direction of the arrows 2—2 of FIG. 1;

FIGURE 3 is a detailed sectional view taken on line 3—3 of FIGURE 2;

FIGURE 4 is a sectional view taken on line 4—4 of FIGURE 2; and

FIGURE 5 is a perspective view of the cutting member.

As illustrated in the drawings, there is provided a drill having a body 10 formed with a thread 11 defining a spiral discharge channel or flute 12. The trailing end of the body is provided with a shank 13 adapted to be inserted within a drill chuck for rotating the drill during a drilling operation. The leading end of the body is formed with a transverse slot 14 and an axially disposed opening 15 communicating with the slot.

A plate-like cutting member 16 is tightly disposed within the slot 14 and is formed with an enlarged hub 17 of greater diameter than the width of the plate-like member 16 extending from its opposite sides. The hub extends into the opening 15 and effects a tight or sung fit with the wall of the opening 15 to insure centering of the member with respect to the body 10. The sides of the member 16 are provided with faces 19 having rear and front portions 20 and 21 respectively. As shown in FIGURE 5, the rear portions 20 are disposed in parallelism while the front portions are inclined toward each other and terminate in a point 22. The faces 19 are beveled to define cutting edges 23.

The leading end of the discharge channel 12 terminates adjacent the rear portions 20 of the member 16 to enable the cuttings from material being drilled to freely flow through the channel and exit at the trailing end thereof. When the member 16 is disposed in proper position within the slot 14, solder 24 is employed to maintain the member fixed to the body. When it is desired to replace the member, the same may be removed upon heating of the solder and detachment of the cutting member from the leading end of the body.

From the foregoing, it will be apparent that my invention provides a cutting member capable of being secured to the leading end of a drill body in an accurate position to dispose the cutting edges equal distances from the axis of the body and beyond the crest of the thread defining the discharge channel and which member may be readily replaced for another or removed for sharpening of its cutting edges.

Without further elaboration, the foregoing will so fully explain the invention that others may, by applying current knowledge, readily adapt the same for use under various conditions of service. Moreover, it is not indispensable that all the features of the invention be used conjointly since they may be employed advantageously in various combinations and subcombinations.

What is claimed is:

1. A drill body having a leading end provided with a transverse slot extending substantially from side to side thereof and having an axial opening in the slot at the longitudinal center of the drill of greater diameter than the width of the slot, said opening extending in the opposed faces of the slot along the length of the drill, and a blade having a portion fitted within the slot and having conforming opposite faces and a second portion projecting outwardly of the end of the drill with a cutting face over said portion, hub portions on opposite faces of the blade and substantially conforming in size and shape to the axial opening to fit therein and to hold the blade in centered position with respect to the leading end of the body, said hub portions extending from the inner end of the blade substantially throughout the axial length of the first-mentioned portion of the blade and terminating substantially at the end of the drill.

2. A drill body according to claim 1 wherein the blade is substantially flat at opposite sides with the hub portions formed in one integral piece therewith and forming substantially semi-cylindrical lateral projections on the flat faces of the blade.

3. The structure as set forth and defined in claim 1, wherein said blade is maintained in fixed relation with said body by detachable means engaging the member.

4. The structure as set forth and defined in claim 1, wherein said body is provided with a spiral channel having its leading end terminating laterally of said blade to effect free flow of cuttings through said channel from material being drilled by said blade.

References Cited

UNITED STATES PATENTS

| | | | |
|---|---|---|---|
| 1,902,885 | 3/1933 | Nixon | 175—411 X |
| 2,502,128 | 3/1950 | Curtis | 175—411 X |
| 2,673,716 | 3/1954 | Avery | 175—410 |
| 2,673,717 | 3/1954 | Bacon | 175—394 X |
| 2,902,260 | 9/1959 | Tilden | 175—394 |
| 3,117,637 | 1/1964 | Mortensen | 175—394 |

FOREIGN PATENTS

| | | |
|---|---|---|
| 18,443 | 8/1912 | Great Britain. |
| 636,768 | 8/1947 | Great Britain. |
| 657,432 | 9/1951 | Great Britain. |

CHARLES E. O'CONNELL, *Primary Examiner.*

RICHARD E. FAVREAU, *Assistant Examiner.*

U.S. Cl. X.R.

175—410